Patented Feb. 26, 1924.

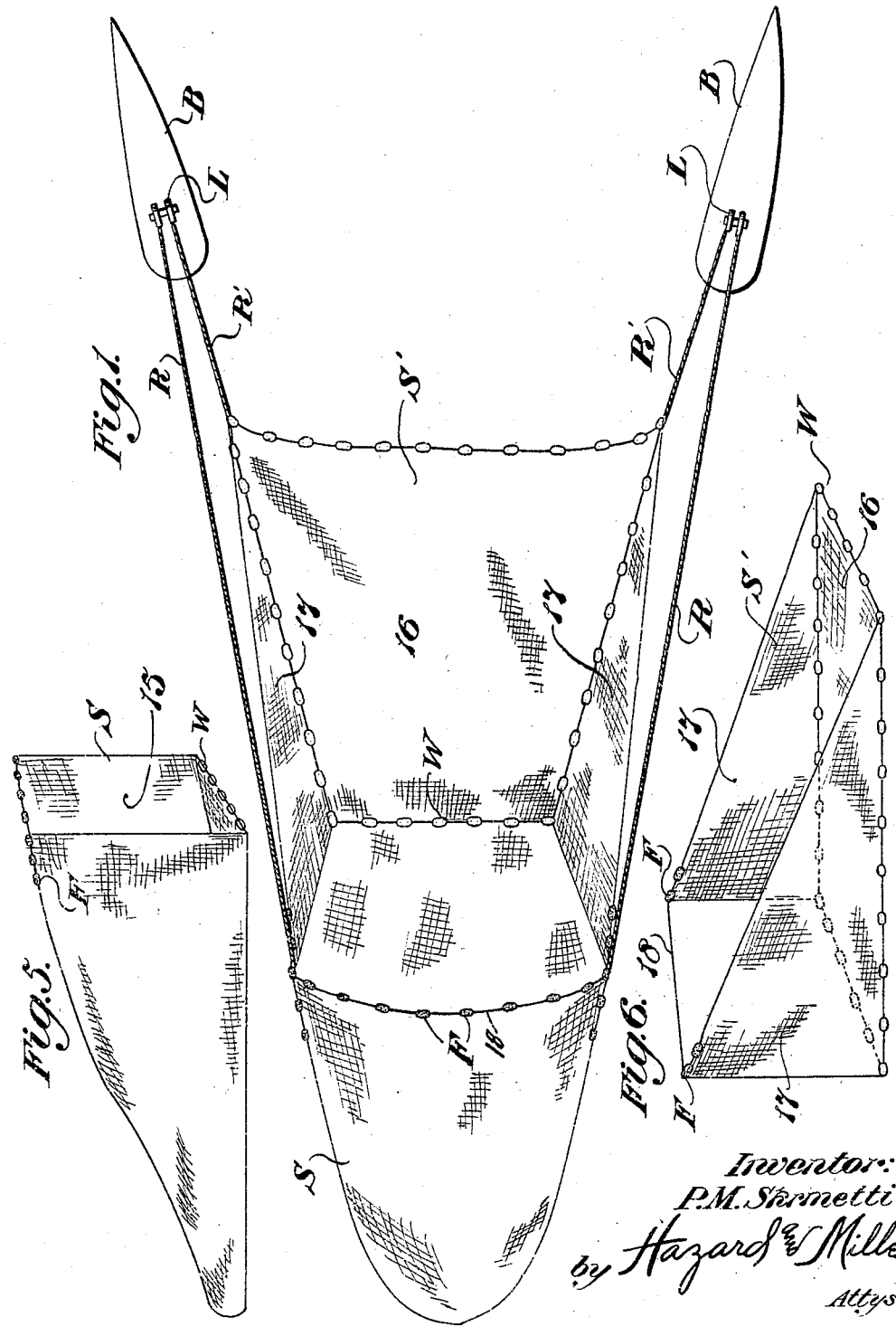

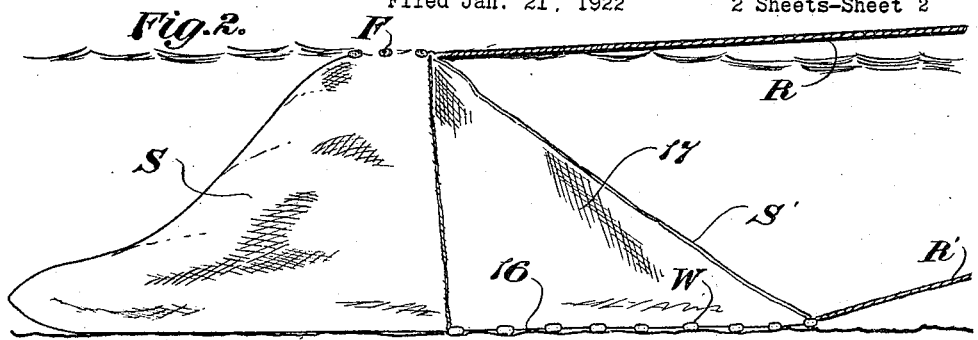
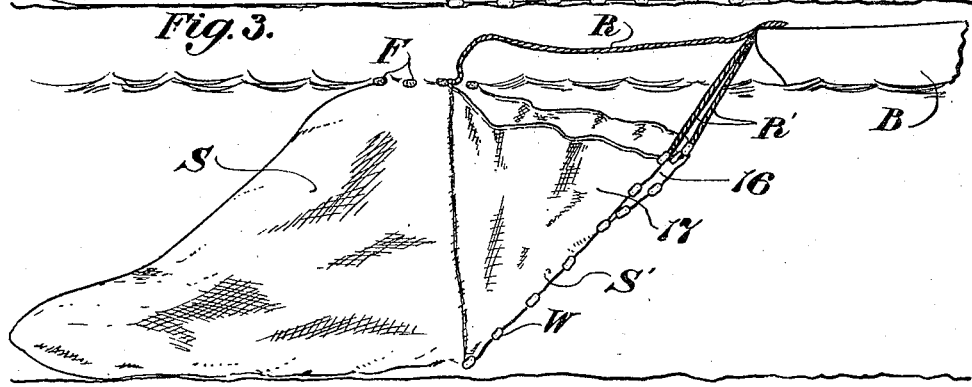
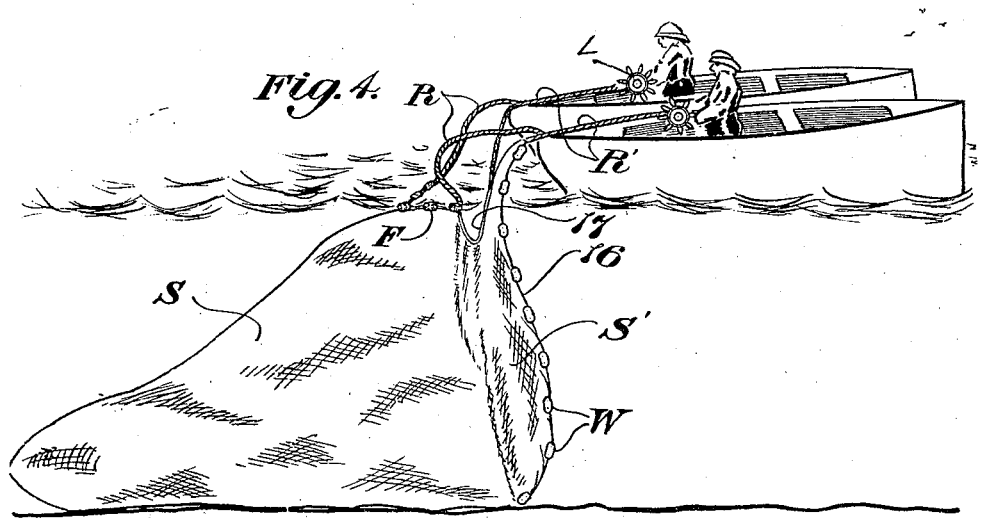

1,485,338

UNITED STATES PATENT OFFICE.

PAUL M. SKRMETTI, OF SAN PEDRO, CALIFORNIA.

FLOATING TRAWLING FISH SEINE.

Application filed January 21, 1922. Serial No. 530,899.

*To all whom it may concern:*

Be it known that I, PAUL M. SKRMETTI, a citizen of Austria, residing at San Pedro, in the county of Los Angeles and State of California, have invented new and useful Improvements in Floating Trawling Fish Seines, of which the following is a specification.

My invention relates to fishing seines, and the purpose of my invention is the provision of a fishing seine including a bag section and a trough or mouth section, the two sections being arranged for suspension within the water so that when trawled, the trough section will serve to direct fish and other marine life into the bag section, and when the trough section is folded upon the bag section, the trapping of the fish within the seine is effected.

I will describe one form of trawling fish seine embodying my invention and will then point out the novel features thereof in claims.

In the accompanying drawings,

Figure 1 is a view showing in top plan one form of trawling fish seine embodying my invention in fully extended position.

Figure 2 is a view showing the seine in side elevation and in fully extended position.

Figure 3 is a view similar to Figure 2 showing the seine in partly folded position.

Figure 4 is a view similar to Figure 3 showing the seine in completely folded position.

Figures 5 and 6 are detail perspective views of the bag and trough sections, respectively, comprised in the seine shown in the preceding views.

Similar reference characters refer to similar parts in each of the several views.

Referring specifically to the drawings my invention in its present embodiment comprises a bag section S which as shown in Figure 5 is of attenuated form and preferably tapered from its opened end to its closed end. The section S is formed of suitable netting and in such manner as to provide a mouth or open end 15 of substantially rectangular formation. The seine also includes a trough section designated generally at S' also formed of suitable netting and including a bottom portion 16 and side portions 17 tapered from one end of the section to the other with the wide ends disposed adjacent the mouth 15 of the bag section S when the trough section is in applied position. A rope 18 or other suitable flexible member connects the wide ends of the side members 17 in the manner clearly shown in Figure 6 so as to provide means for securing the trough section to the bag section and at the same time preventing a collapsing of the side members.

In the association of the trough section with the bag section, the two sections are connected in the manner clearly shown in Figures 1 and 2 wherein it will be seen that the wide ends of the side members 17 are connected to the side portions of the mouth 15, and the rope 18 is connected to the top of the mouth 15 while the bottom 16 is connected to the bottom of the mouth 15. Suitable means such as ropes or other flexible members (not shown) are employed for effecting the connection of the two sections.

The sections of the net are held in fully extended position when in the water by floats F mounted on the sections S and S' in the manner shown in Figures 1, 5 and 6, while weights W are mounted on the edges of the bottom 16 and on the lower edge of the mouth 15. This arrangement obviously maintains the mouth 15 in rectangular or fully extended position, and the sides 17 of the trough section in upstanding position, thereby causing the trough section to function in providing an entrance way for the bag section.

In practice, ropes, cables or the like R are connected to the upper corners of the mouth 15 of the bag section S, while other ropes R' are connected to the forward corners of the trough section S', all in the manner clearly shown in Figure 1. The free ends of the ropes R and R' are adapted for mounting on windlasses L carried in boats B so as to be manually operated to wind or unwind the ropes in effecting a folding or unfolding of the seine.

In operation, the seine is positioned within the water in the manner shown in Figure 2, and with the ropes R and R' connected to the windlasses L of the boats B, forward movement of the boats will exert a forward pull on the ropes thus maintaining the seine in fully extended position as is clearly shown in Figure 1. In practice, the boats are moved forward thereby dragging the seine in extended position. The fish are thus gathered within the trough section S' and ultimately conveyed into the bag section S. At the end of this trawling operation, the boats B are moved rearwardly and the windlasses L are simultaneously operated to maintain the ropes R' taut thereby moving the trough section rearwardly toward the bag section and at the same time maintaining the bottom of the trough section fully extended, all as clearly shown in Figure 3. After the boats have reached a position directly above the seine, the trough section is completely folded upon the bag section to close the mouth 15 thereby trapping the fish within the bag section.

Although I have herein shown and described only one form of trawling fish seine embodying my invention, it is to be understood that various changes and modifications may be made herein without departing from the spirit of the invention and the spirit and scope of the appended claims.

What I claim is:

1. A trawling fish seine comprising a bag section, and a trough section arranged in advance of the bag section and adapted to be folded against the bag section to completely close the latter, said bag section having an unrestricted mouth which merges into the trough section.

2. A trawling fish seine comprising a bag section of attenuated form, a trough section connected to the mouth of the bag section, said bag section having an unrestricted mouth which merges into the trough section and means connected to the sections adapted to be manipulated to lift and fold the trough section vertically to close the mouth of the bag section and to simultaneously maintain the bottom of the trough section in extended position.

3. A trawling fish seine comprising a bag section, a trough section connected to the mouth of the bag section, said bag section having an unrestricted mouth which merges into the trough section and flexible members connected to the sections and adapted to be manipulated to fold the trough section to lift and thus close the mouth of the bag section and to simultaneously maintain the bottom of the trough section in extended position.

4. A trawling fish seine, comprising a bag section, and trough section movably secured to the bag section and including a bottom member normally occupying a horizontal position and adapted to be lifted to a vertical position to close the mouth of the bag section, said bag section having an unrestricted mouth which merges into the trough section.

5. A trawling fish seine, comprising a bag section, and trough section movably secured to the bag section and including a bottom member normally occupying a horizontal position and adapted to be lifted to a vertical position to close the mouth of the bag section, and side members adapted to be folded when the bottom member is lifted to co-operate with the bottom member in completely closing the bag section, said bag section having an unrestricted mouth which merges into the trough section.

6. A trawling fish seine, comprising a bag section, and a trough section, said bag section having an unrestricted mouth which merges into the trough section, said trough section normally occupying an extended position in which the mouth of the bag section is open, and adapted to be folded vertically to close said mouth.

7. A trawling fish seine comprising a bag section having an open end and a closed end, the cross section of the bag section decreasing from the open end to the closed end, a trough section connected to the open end of the bag section and including triangular side portions and a bottom portion connecting the side portion, and means by which the troughed section can be folded upon the bag section to close the open end of the latter.

8. A trawling fish seine comprising a bag section having an unrestricted open end and a closed end, a trough section connected to the open end of the bag section so that the open end merges into the trough section, said bag and trough sections decreasing in cross sectional area from their connected ends to their free ends, and means by which the trough section can be folded to completely close the open end of the bag section.

In testimony whereof I have signed my name to this specification.

P. M. SKRMETTI.